United States Patent [19]
Reniger et al.

[11] Patent Number: 6,164,803
[45] Date of Patent: Dec. 26, 2000

[54] FOLD-UP NAVIGATION LIGHT

[75] Inventors: Bruce L. Reniger, Alto, Mich.;
Warwick M. Whitley, Burnet, Tex.

[73] Assignee: Attwood Corporation, Lowell, Mich.

[21] Appl. No.: 09/426,312

[22] Filed: Oct. 25, 1999

[51] Int. Cl.$^7$ ............................. B60Q 1/00; F21V 1/00
[52] U.S. Cl. .................... 362/477; 362/413; 362/431; 114/353; 114/354; 340/984
[58] Field of Search ............................ 362/413, 431, 362/477, 414; 114/343, 66, 352, 353, 354; 340/984, 985

[56] References Cited

U.S. PATENT DOCUMENTS

| | | | |
|---|---|---|---|
| 1,094,633 | 4/1914 | Beehler | 135/74 |
| 1,311,145 | 7/1919 | Zeindler et al. | 285/27 |
| 2,577,811 | 12/1951 | Rutledge | 403/102 |
| 2,704,963 | 3/1955 | Parachek | 248/480 |
| 2,895,757 | 7/1959 | Kaspar | 403/100 |
| 4,049,959 | 9/1977 | Ledterman | 362/473 |
| 4,494,177 | 1/1985 | Matthews | 362/402 |
| 4,554,620 | 11/1985 | Warshawsky | 362/269 |
| 4,827,389 | 5/1989 | Crum | 362/388 |
| 4,856,452 | 8/1989 | Pingel et al. | 114/364 |
| 5,142,457 | 8/1992 | Wehner | 362/70 |
| 5,704,704 | 1/1998 | Reichard et al. | 362/1 |
| 6,070,996 | 6/2000 | McCollum | 362/431 |

*Primary Examiner*—Sandra O'Shea
*Assistant Examiner*—Ali Alavi
*Attorney, Agent, or Firm*—Price, Heneveld, Cooper, DeWitt & Litton

[57] ABSTRACT

A fold-up navigation light for boats and the like includes an elongate support pole having a bifurcated construction with an upper portion supporting a light, and a lower portion configured for mounting on an associated boat. A pivot coupling selectively interconnects the upper and lower portions of the support pole for rotation between an extended position wherein the upper and lower portions are aligned to support the light at a raised unobstructed location above the boat, and a fully retracted position wherein the upper and lower portions are folded together in a parallel relationship to reduce the length of the support pole to facilitate storage on the boat.

30 Claims, 3 Drawing Sheets

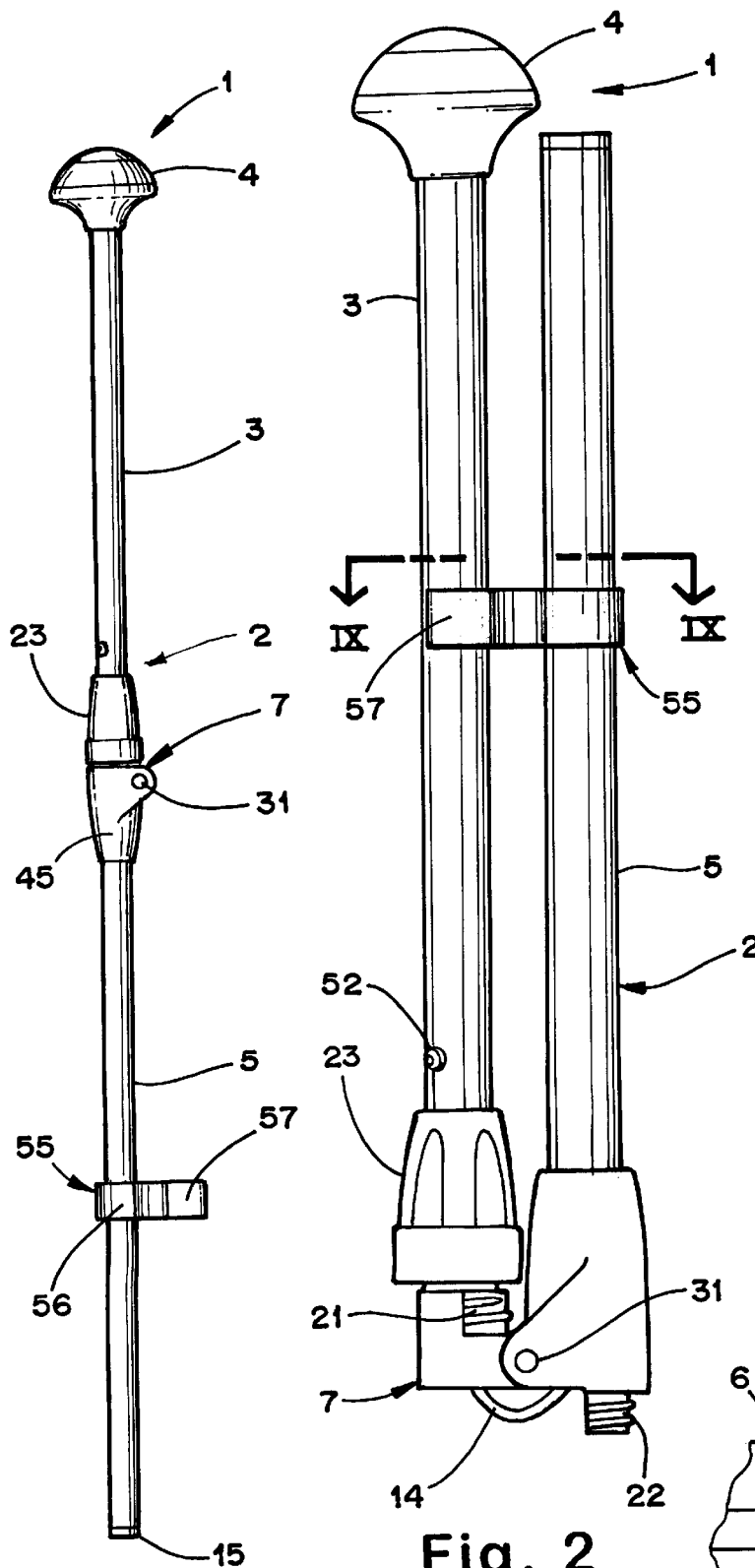
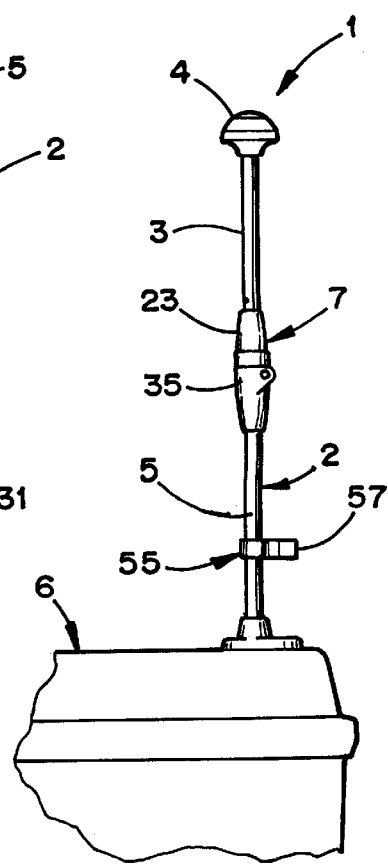
Fig. 1
Fig. 2
Fig. 3

FOLD-UP NAVIGATION LIGHT

BACKGROUND OF THE INVENTION

The present invention relates to lights, and in particular to a fold-up navigation light for boats and the like.

Various government regulations require boaters to display navigation lights so that the operators of marine crafts can easily determine the position and direction of movement of such marine vehicles. In addition to requiring a red port side bow light and a green starboard side bow light, boat operators are required to display a white light either at the stern of the boat or at another position aft of the bow lights at a predetermined elevation. Such white lights are commonly referred to as all-round lights or 360° lights, and are required to project an uninterrupted beam of light in all directions in a substantially horizontal plane which is not obstructed by the boat.

Many recreational boats include raised areas, such a windshields, raised decks, flying bridges, and the like which can interfere with the light emitted from an all-round light. Consequently, such navigation lights must be raised to a substantial elevation above the deck of the boat in which the same is mounted, so as to achieve an uninterrupted beam of light in all directions. Consequently, the support poles associated with such navigation lights have become quite long, presenting substantial difficulty in the handling and storage of the same.

SUMMARY OF THE INVENTION

One aspect of the present invention is to provide a fold-up navigation light for boats and the like which includes an elongate support pole having a bifurcated construction with an upper portion supporting a light, and a lower portion configured for mounting on an associated boat. A pivot coupling selectively interconnects the upper and lower portions of the support pole for rotation between an extended position wherein the upper and lower portions are aligned to support the light at a raised unobstructed location above the boat, and a fully retracted position wherein the upper and lower portions are folded together in a parallel relationship to reduce the length of the support pole to facilitate storage on the boat.

Another aspect of the present invention is to provide a light for boats and the like, comprising an elongate support pole having a bifurcated construction with an upper portion supporting a light thereon, and a lower portion shaped for retention. A pivot coupling selectively interconnects the upper and lower portions of the support pole for rotation between a fully extended position wherein the upper and lower portions of the support pole are generally aligned to support the light at a raised location, and a fully retracted position wherein the upper and lower portions of the pole are folded together in a parallel relationship to reduce the length of the support pole to facilitate storage. The pivot coupling includes a split threaded coupling having a first portion connected with the upper portion of the support pole, a second portion connected with the lower portion of the support pole, and a threaded collar slidably supported on one of the upper and lower support pole portions, and shaped to mate with and threadedly interconnect the first and second portions of the split threaded coupling when the support pole is in the fully extended position to selectively retain the support pole in the fully extended position.

The principal objects of the present invention are to provide a fold-up navigation light with a pivot coupling that permits quick and easy rotation between an extended use position and retracted storage position, yet forms a rigid joint to securely retain the light in the extended position for operation. The fold-up navigation light can be easily broken down or folded into a compact configuration for storage on an associated boat. Electrical power wiring is routed internal of the navigation light to provide additional safety and convenience. The fold-up navigation light has a lightweight, uncomplicated construction that is quite durable, yet meets marine requirements. Preferably, a retainer clip is provided to selectively retain the fold-up navigation light in its retracted storage position. The fold-up navigation light is efficient in use, economical to manufacture, capable of a long operating life, and particularly well adapted for the proposed use.

These and other advantages of the invention will be further understood and appreciated by those skilled in the art by reference to the following written specification, claims, and appended drawings.

BRIEF DESCRIPTION OF THE DRAWINGS

FIG. 1 is a side elevational view of a fold-up navigation light embodying the present invention, shown in a fully extended operating position.

FIG. 2 is a side elevational view of the fold-up navigation light, shown in a fully retracted storage position.

FIG. 3 is a partially schematic side elevational view of the fold-up navigation light, shown mounted on an associated boat.

DETAILED DESCRIPTION OF PREFERRED EMBODIMENT

Figure 4:
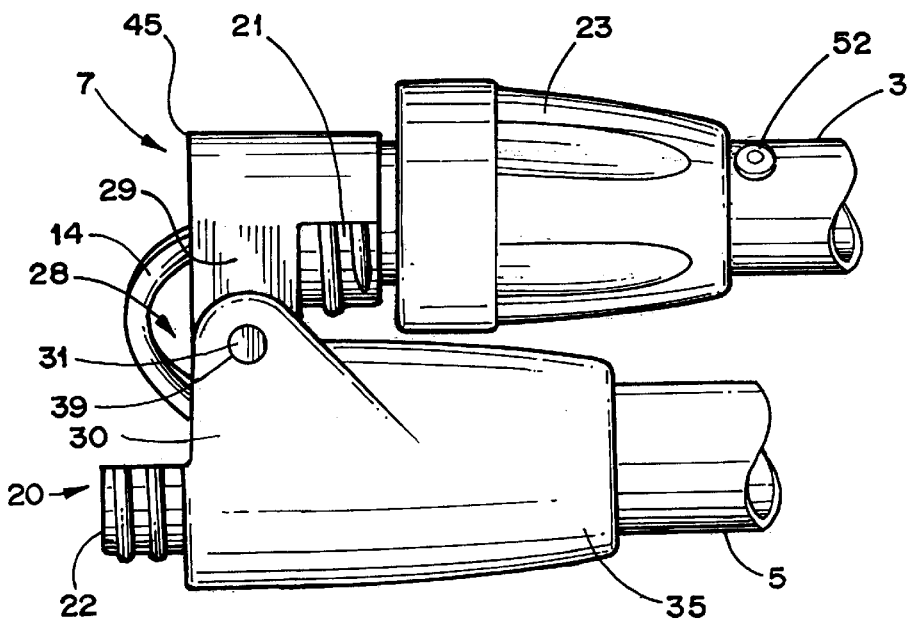
FIG. 4 is an enlarged, fragmentary, side elevational view of the fold-up navigation light, particularly showing a pivot coupling portion thereof in the fully retracted storage position.
Figure 5:
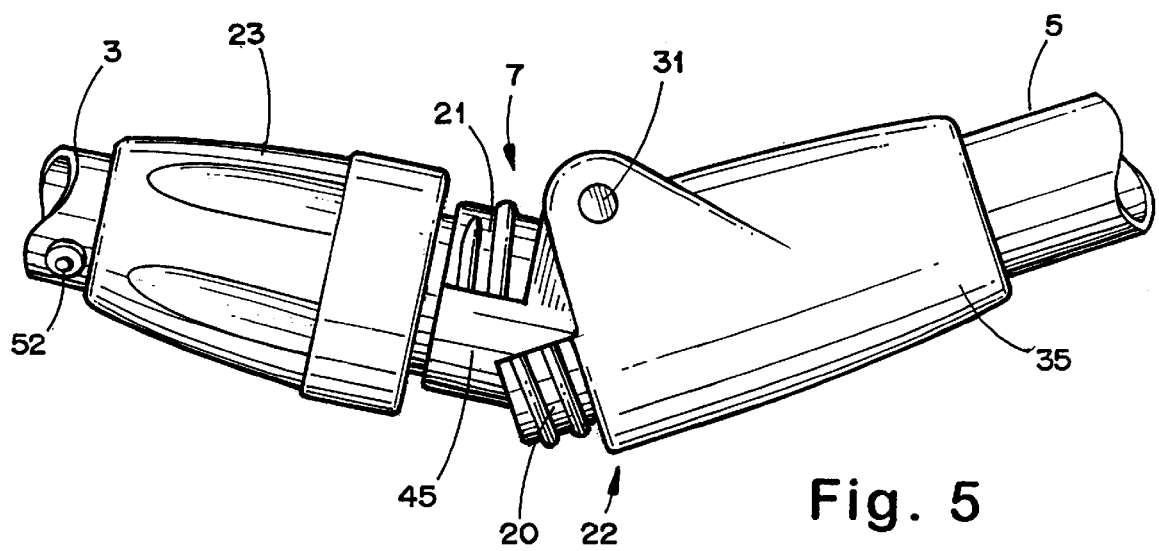
FIG. 5 is an enlarged, fragmentary, side elevational view of the pivot coupling, shown being rotated from the fully retracted storage position toward the fully extended operating position.

For purposes of description herein, the terms "upper", "lower", "right", "left", "rear", "front", "vertical", "horizontal", and derivatives thereof shall relate to the invention as oriented in FIGS. 1 and 3. However, it is to be understood that the invention may assume various alternative orientations, except where expressly specified to the contrary. It is also to be understood that the specific devices illustrated in the attached drawings, and described in the following specification are simply exemplary embodiments of the inventive concepts defined in the appended claims. Hence, specific dimensions and other physical characteristics relating to the embodiments disclosed herein are not to be considered as limited, unless the claims expressly state otherwise.

The reference numeral 1 (FIG. 1) generally designates a fold-up navigation light embodying the present invention.

Fold-up navigation light 1 includes an elongate support pole 2, having a bifurcated construction with an upper portion 3 supporting a light 4, and a lower portion 5 configured for mounting on an associated boat, such as the boat 6 illustrated in FIG. 3. A pivot coupling 7 selectively interconnects the upper and lower portions 3 and 5 of support pole 2 for rotation between an extended position, as shown in FIG. 1, wherein the upper and lower portions 3 and 5 are aligned to support light 4 at a raised unobstructed location above the boat 6, and a fully retracted position, as shown in FIG. 2, wherein the upper and lower portions 3 and 5 are folded together in a parallel relationship to reduce the length of support pole 2 to facilitate storage on the boat 6.

The illustrated light 4 (FIG. 8) is an all-round green navigation light of the type configured to emit light in a 360° pattern about support pole 2. Preferably, light 4 is of the type disclosed in U.S. Pat. No. 5,882,109 to McKinney et al, which is hereby incorporated by reference herein, and includes a round light base 10 connected with the upper end of upper support pole 3. A conventional light bulb 9 is mounted within light base 10, and a lens 11 and top cap 12 enclose the upper end of base 10. Lens 11 is designed to emit a beam of light in all directions along a horizontal plane to comply with boating regulations. Light base 10 can be connected with support pole 2 by an articulated joint (not shown), such as that disclosed in the McKinney et al U.S. Pat. No. 5,882,109.

Figure 8:
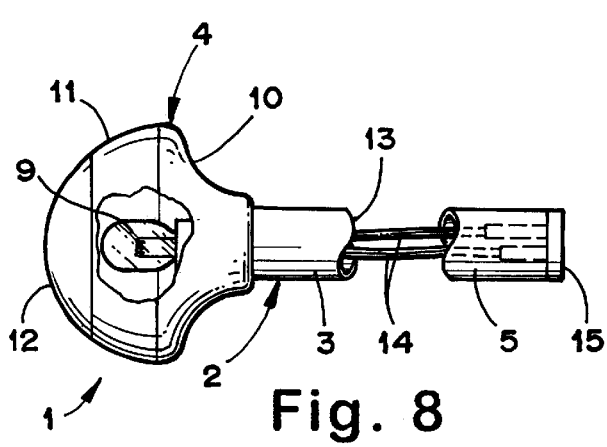
FIG. 8 is a side elevational view of the fold-up navigation light, wherein portions thereof have been broken away to illustrate the internal routing of wiring.
Figure 9:
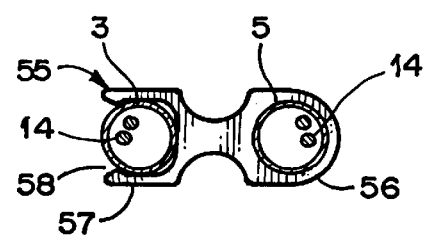
FIG. 9 is a lateral cross-sectional view of the navigation light, taken along the line IX—IX, FIG. 2.

In the illustrated example, support pole 2 (FIGS. 1–3) has a hollow tubular construction, wherein the upper and lower support pole portions 3 and 5 are both cylindrical, and have a substantially identical outside diameter. Support pole 2 is rigid, yet lightweight, and may be constructed from an extruded metal such as aluminum or the like, plastic, or other similar materials. As best illustrated in FIG. 8, the interior 13 of the upper and lower support pole portions 3 and 5 is hollow to facilitate routing conductors or electrical power wires 14 between light 9 and a socket 15 mounted at the bottom of lower support pole portion 5. Socket 15 has a conventional construction, and is adapted to be received in a mating plug (not shown) to supply power from the boat to light 9. The illustrated support pole 2 has a rather substantial overall length, such as in the range of 3–5 feet, so as to position light 4 at an elevated, unobstructed position above the boat 6, and thereby achieve compliance with those regulations governing marine navigation. In the example shown in FIG. 3, navigation light 1 is mounted near the stem of boat 6, and extends upwardly therefrom in a substantially vertical orientation.

Figure 6:
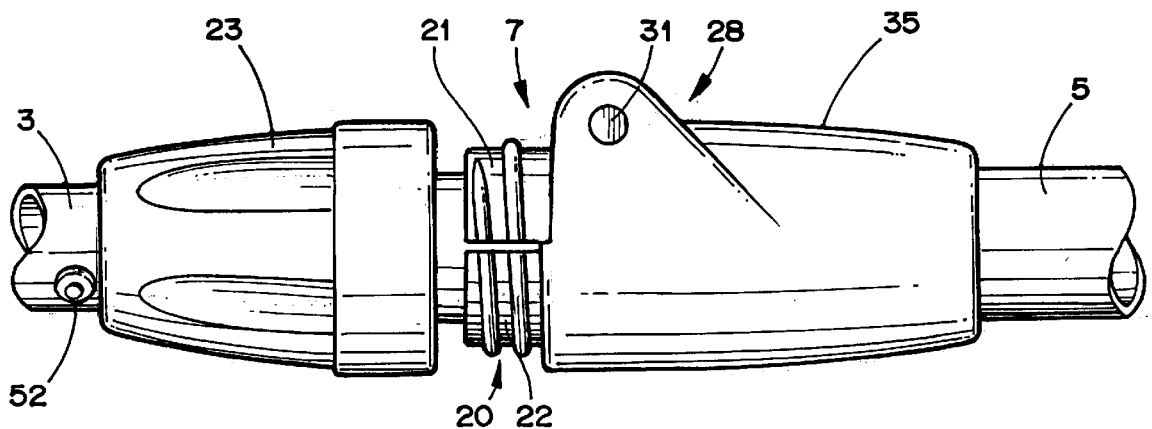
FIG. 6 is an enlarged, fragmentary, side elevational view of the pivot coupling, shown in the fully extended position, prior to locking the same in place with a threaded collar.
Figure 7:
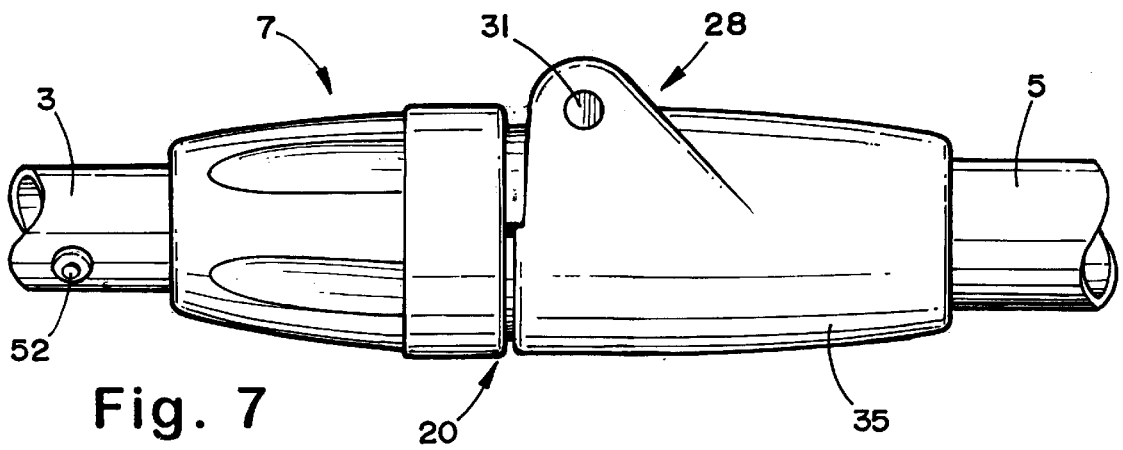
FIG. 7 is an enlarged, fragmentary, side elevational view of the pivot coupling, shown in the fully extended position, with the lock collar engaged.

The upper and lower portions 3 and 5 of support pole 2 are rotatably interconnected or foldable by pivot coupling 7. The illustrated pivot coupling 7 includes a split threaded coupling 20, which as best illustrated in FIGS. 4–7, has a first portion 21 thereof connected with the upper portion 3 of support pole 2, and a second portion 22 connected with the lower portion 5 of support pole 2. The illustrated pivot coupling 7 also includes a threaded collar 23 slidably supported on one of the upper and lower pole portions 3 and 5, and is shaped to mate with and threadedly interconnect with the first and second portions 21 and 22 of split threaded coupling 20 when support pole 2 is in the fully extended position, as shown in FIG. 7.

The illustrated pivot coupling 7 also includes a hinge 28 (FIGS. 4–7) having a first portion 29 connected with the upper portion 3 of support pole 2, and a second portion 30 connected with the lower portion 5 of support pole 2. A hinge pin 31 rotatably interconnects the first and second portions 29 and 30 of hinge 28 to permit rotation of support pole 2 between the fully extended position (FIG. 1) and the fully retracted position (FIG. 2).

In the illustrated example, hinge 28 is formed integrally with split threaded coupling 20, wherein the lower coupling half 35 is integrally molded from plastic or other synthetic materials, and includes a hollow cylindrical lower end in which the upper end of support pole lower portion 5 is closely received and retained. The lower portion 22 of split threaded coupling 20 is integrally formed at the upper end of lower coupling half 35, and comprises a semicircular set of male threads which project longitudinally from lower coupling half 35. Lower coupling half 35 includes a laterally offset lobe area in the shape of a clevis, with an aperture 39 extending laterally through the opposite sides thereof to receive hinge pin 31 therein, and define the lower hinge half 30.

The opposite coupling half 45 is also an integrally molded one-piece unit, wherein male threads 46 are formed in a semicircular pattern around the outer end thereof, and are shaped to mate with the threads 37 on lower coupling half 35 when support pole 2 is in the fully extended position. Upper coupling half 45 may also be molded from plastic or other synthetic materials, and includes a hollow cylindrical upper end in which the lower end of support pole upper portion 3 is closely received and retained. Upper coupling half 45 also includes a laterally extending lobe portion 47 which is shaped to be received between the opposite sides of lobe 38, and includes a through-aperture in which hinge pin 31 is received. Both coupling halves 35 and 45 have a hollow construction to receive wires 14 therethrough.

In the illustrated pivot coupling 7, hinge pin 31 is axially offset from the outer surfaces of the tubular upper and lower portions 3 and 5 of support pole 2 to permit the upper and lower support pole portions to pivot 180° into a spaced apart mutually parallel relationship, as shown in FIG. 2. The spaced apart relationship of support pole portions 3 and 5 in the fully retracted storage position provides clearance for the coupling halves 35 and 45, and avoids interference between the lower end of lower support pole portion 5 and light 4.

In the illustrated example, threaded collar 23 (FIGS. 4–7) is slidably and rotatably mounted on the upper portion 3 of support pole 2, adjacent the lower end thereof. Threaded collar 23 includes a tapered exterior shaped to mate with the tapered exterior shape of the lower coupling half 35. The lower end of threaded collar 23 includes an internally disposed female thread that is adapted to mate with the male threads 37 and 46 on coupling halves 35 and 45 when support pole 2 is in the fully extended position. A stop screw 52 is positioned axially in the upper portion 3 of support pole 2 adjacent the uppermost end of threaded collar 23, to positively position threaded collar 23 at a location adjacent pivot coupling 7.

The wires 14 which electrically connect light 9 with socket 15 have sufficient length to form slack adjacent pivot coupling 7 to permit the upper and lower portions 3 and 5 of support pole 2 to rotate between the fully extended and fully retracted positions without straining wires 14. A protective sheath (not shown) may be provided to cover wires 14 in the area of pivot coupling 7 to protect those portions of wires 14 which may be exposed when navigation light 1 is fully or partially retracted.

Preferably, a retainer 55 (FIGS. 1–3 and 9) is provided to selectively retain the fold-up navigation light 1 in the fully retracted storage position. In the illustrated example, retainer 55 has a one-piece molded construction, with a cylindrical sleeve portion 56 mounted about the exterior surface of lower support pole 5. The opposite side of retainer 55 includes a U-shaped catch 57 with an open side 58 shaped to closely receive and selectively frictionally retain therein the upper portion 3 of support pole 2. Retainer 55 is preferably mounted on the lower portion 5 of support pole 2 to minimize obstruction, and in the illustrated example is disposed adjacent an intermediate portion thereof.

In operation, fold-up navigation light 1 can be easily shifted from the fully retracted storage position shown in FIG. 2 to the fully extended operational position shown in FIG. 1 in the following fashion. The operator simply grasps the opposite support pole portions 3 and 5 and pivotally pulls the same apart to disengage the upper support pole portion 3 from retainer 55. The user then rotates the upper and lower portions 3 and 5 of support pole 2 about hinge pin 31, in the fashion illustrated in FIG. 5, until the upper and lower support pole members 3 and 5 are fully aligned, as shown in FIG. 6. In this position, the opposite halves of split threaded coupling 20 come together, such that the threads 37 and 46 mate. Threaded collar 23 is then positioned over threads 37 and 46, and rotated to threadedly engage the same therewith. In this position, the opposite halves of pivot coupling 7 are securely retained together in the fully extended operational position, as shown in FIG. 7. Fold-up navigation light 1 can be broken down or shifted back to the fully retracted storage position by simply reversing the steps outlined above.

The bifurcated construction of support pole 2 and pivot coupling 7 combine to provide a fold-up navigation light that has substantial length to position the light 4 at an unobstructed location above the boat, yet can be easily folded up into a relatively compact storage configuration. Pivot coupling 7 securely retains the upper and lower halves of the support pole together when it is in its fully extended operational position, yet can be easily reconfigured for storage.

In the foregoing description, it will be readily appreciated by those skilled in the art that modifications may be made to the invention without departing from the concepts disclosed herein. Such modifications are to be considered in the following claims, unless these claims by their language expressly state otherwise.

The invention claimed is as follow:

1. A fold-up navigation light for boats and the like, comprising:
    a navigation light having a source of illumination;
    an elongate support pole having a bifurcated construction with an upper portion thereof supporting said navigation light thereon, and a lower portion thereof shaped to be mounted on an associated boat; and
    a pivot coupling selectively interconnecting said upper and lower portions of said support pole for rotation between a fully extended position wherein said upper and lower portions of said support pole are generally aligned to support said navigation light at a raised unobstructed location above the boat, and a fully retracted position wherein said upper and lower portions of said pole are folded together in a parallel relationship to reduce the length of said support pole to facilitate storage on the boat.

2. A fold-up navigation light as set forth in claim 1, wherein:
    said pivot coupling includes a split threaded coupling having a first portion thereof connected with said upper portion of said support pole and a second portion thereof connected with said lower portion of said support pole, and a threaded collar slidably supported on one of said upper and lower portions of said support pole, and shaped to mate with and threadedly interconnect said first and second portions of said split threaded coupling when said support pole is in said fully extended position to selectively retain said support pole in said fully extended position.

3. A fold-up navigation light as set forth in claim 2, wherein:
    said pivot coupling includes a hinge, having a first portion thereof connected with said upper portion of said support pole, a second portion thereof connected with said lower portion of said support pole, and a hinge pin rotatably interconnecting said first and second portions of said hinge to permit rotation of said support pole between said fully extended position and said fully retracted position.

4. A fold-up navigation light as set forth in claim 3, including:
    a retainer connected with one of said upper and lower portions of said support pole and including a catch selectively engaging the other one of said upper and lower portions of said support pole to selectively retain said support pole in said fully retracted position for storage.

5. A fold-up navigation light as set forth in claim 4, wherein:
    said support pole has a tubular construction with a hollow interior through which wires are routed to provide power to said navigation light.

6. A fold-up navigation light as set forth in claim 5, wherein:
    said navigation light comprises an all-round light configured to emit light in a 360° pattern about said support pole.

7. A fold-up navigation light as set forth in claim 6, wherein:
    said navigation light is configured to emit light along a generally horizontal plane.

8. A fold-up navigation light as set forth in claim 7, wherein:
    said upper and lower portions of said support pole comprise cylindrically-shaped tubular segments each having an outer surface.

9. A fold-up navigation light as set forth in claim 8, wherein:
    said hinge pin is axially offset from the outer surfaces of said tubular segments to permit said upper and lower portions of said support pole to pivot 180° into a spaced apart mutually parallel relationship.

10. A fold-up navigation light as set forth in claim 9, wherein:
    said retainer is connected with said lower portion of said support pole to minimize obstruction.

11. A fold-up navigation light as set forth in claim 10, wherein:
    said catch comprises a U-shaped retainer with an open side thereof configured to closely receive and selectively frictionally retain therein said upper portion of said support pole.

12. A fold-up navigation light as set forth in claim 11, including:
    an electrical connector mounted in a lower portion of said support pole and shaped for detachable connection with a power source associated with the boat.

13. A fold-up navigation light as set forth in claim 12, including:

electrical conductors extending through the hollow interior of said support pole and electrically connecting said navigation light with said electrical connector.

14. A fold-up navigation light as set forth in claim 13, wherein:

said electrical conductors have sufficient length to form slack adjacent said pivot coupling to permit said upper and lower portions of said support pole to rotate between said fully extended and fully retracted positions without straining said electrical conductors.

15. A fold-up navigation light as set forth in claim 14, wherein:

said first and second portions of said split threaded coupling include male threads; and said threaded collar includes female threads which mate with said male threads.

16. A fold-up navigation light as set forth in claim 15, wherein:

said threaded collar is mounted on said upper portion of said support pole for rotation and longitudinal sliding thereon.

17. A fold-up navigation light as set forth in claim 1, wherein:

said pivot coupling includes a hinge, having a first portion thereof connected with said upper portion of said support pole, a second portion thereof connected with said lower portion of said support pole, and a hinge pin rotatably interconnecting said first and second portions of said hinge to permit rotation of said support pole between said fully extended position and said fully retracted position.

18. A fold-up navigation light as set forth in claim 1, including:

a retainer connected with one of said upper and lower portions of said support pole and including a catch selectively engaging the other one of said upper and lower portions of said support pole to selectively retain said support pole in said fully retracted position for storage.

19. A fold-up navigation light as set forth in claim 1, wherein:

said support pole has a tubular construction with a hollow interior through which wires are routed to provide power to said navigation light.

20. A fold-up navigation light as set forth in claim 1, wherein:

said navigation light comprises an all-round light configured to emit light in a 360° pattern about said support pole.

21. A fold-up navigation light as set forth in claim 1, wherein:

said navigation light is configured to emit light along a generally horizontal plane.

22. A fold-up navigation light as set forth in claim 1, wherein:

said upper and lower portions of said support pole comprise cylindrically-shaped tubular segments each having an outer surface.

23. A fold-up navigation light as set forth in claim 22, wherein:

said hinge pin is axially offset from the outer surfaces of said tubular segments to permit said upper and lower portions of said support pole to pivot 180° into a spaced apart mutually parallel relationship.

24. A fold-up navigation light as set forth in claim 1, including:

an electrical connector mounted in a lower portion of said support pole and shaped for detachable connection with a power source associated with the boat.

25. A foldable light for boats and the like, comprising:

a light having a source of illumination;

an elongate support pole having a bifurcated construction with an upper portion thereof supporting said light thereon, and a lower portion thereof shaped for retention; and a pivot coupling selectively interconnecting said upper and lower portions of said support pole for rotation between a fully extended position wherein said upper and lower portions of said support pole are generally aligned to support said light at a raised location, and a fully retracted position wherein said upper and lower portions of said pole are folded together in a parallel relationship to reduce the length of the support pole to facilitate storage;

said pivot coupling including a split threaded coupling having a first portion thereof connected with said upper portion of said support pole and a second portion thereof connected with said lower portion of said support pole, and a threaded collar slidably supported on one of said upper and lower portions of said support pole, and shaped to mate with and threadedly interconnect said first and second portions of said split threaded coupling when said support pole is in said fully extended position to selectively retain said support pole in said fully extended position.

26. A foldable light as set forth in claim 25, wherein:

said pivot coupling includes a hinge, having a first portion thereof connected with said upper portion of said support pole, a second portion thereof connected with said lower portion of said support pole, and a hinge pin rotatably interconnecting said first and second portions of said hinge to permit rotation of said support pole between said fully extended position and said fully retracted position.

27. A foldable light as set forth in claim 26, including:

a retainer connected with one of said upper and lower portions of said support pole and including a catch selectively engaging the other one of said upper and lower portions of said support pole to selectively retain said support pole in said fully retracted position for storage.

28. A foldable light as set forth in claim 27, wherein:

said support pole has a tubular construction with a hollow interior through which wires are routed to provide power to said light.

29. A foldable light as set forth in claim 28, wherein:

said upper and lower portions of said support pole comprise cylindrically-shaped tubular segments each having an outer surface.

30. A foldable light as set forth in claim 29, wherein:

said hinge pin is axially offset from the outer surfaces of said tubular segments to permit said upper and lower portions of said support pole to pivot 180° into a spaced apart mutually parallel relationship.

* * * * *